June 2, 1925. 1,540,149
G. WALKER
MECHANISM FOR PREVENTING BACKLASH IN PRECISION INSTRUMENTS, ETC
Filed Jan. 25, 1923 2 Sheets-Sheet 1

Inventor:
George Walker,
by Roberts, Roberts & Cushman
his attys.

June 2, 1925.
G. WALKER
1,540,149
MECHANISM FOR PREVENTING BACKLASH IN PRECISION INSTRUMENTS, ETC
Filed Jan. 25, 1923    2 Sheets-Sheet 2
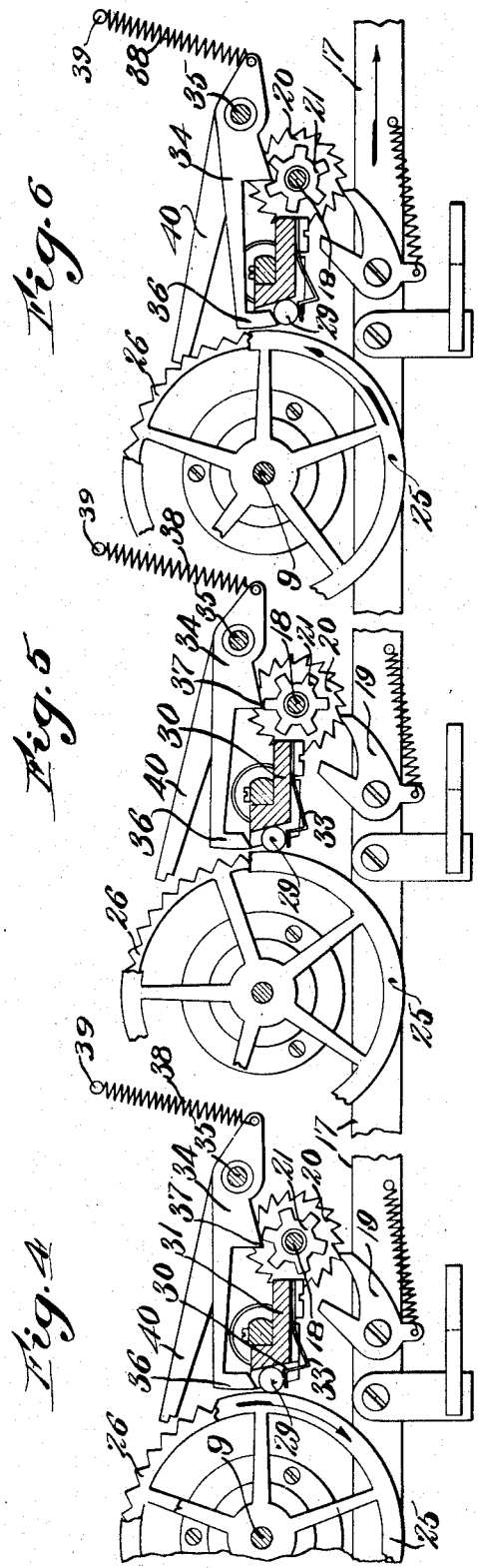
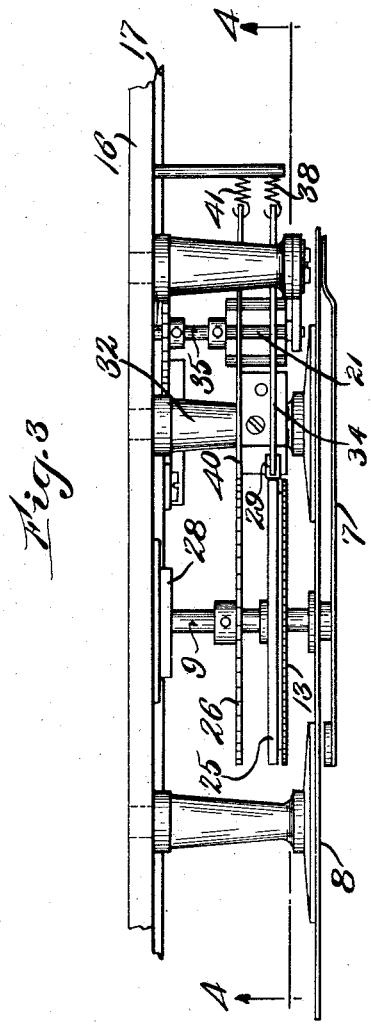
Inventor:
George Walker,
by Roberts, Roberts & Cushman
his attys.

Patented June 2, 1925.

1,540,149

UNITED STATES PATENT OFFICE.

GEORGE WALKER, OF NEWTON CENTER, MASSACHUSETTS.

MECHANISM FOR PREVENTING BACKLASH IN PRECISION INSTRUMENTS, ETC.

Application filed January 25, 1923. Serial No. 614,835.

*To all whom it may concern:*

Be it known that I, GEORGE WALKER, a citizen of the United States of America, and resident of Newton Center, in the county of Middlesex and State of Massachusetts, have invented new and useful Improvements in Mechanism for Preventing Backlash in Precision Instruments, Etc., of which the following is a specification.

This invention relates to control mechanism for precision instruments of the type in which a member such as a pointer is adapted to be advanced over a predetermined path, such as the face of a dial, and afterwards reset.

Objects of the invention are to hold an indicator against retrograde movement when it is stopped at the end of its advance movement to prevent retrograde movement at any time during its advance, to maintain the driving mechanism inoperative while the device is being reset, to prevent rebound when the device returns to reset position, to provide for simultaneous control of the operation of certain of the elements, and in general to improve devices of the class described and to render them more efficient and accurate in operation.

For the purpose of illustrating the invention, one concrete embodiment thereof is shown in the accompanying drawings, in which:—

Fig. 3 is a top plan view; and

Figs. 4, 5 and 6 are sectional views on the line 4—4 of Fig. 3 showing the mechanism in various positions.

While it is to be understood that the invention is applicable to various instruments where a pointer or other element is to be advanced along a predetermined path and then reset, for the purpose of illustration the invention is herein shown as applied to a ship's instrument of the type disclosed in my copending applications Serial No. 273,744, filed January 19, 1919, Serial No. 319,392, filed August 23, 1919, and Serial No. 614,338, filed on even date herewith, to which reference is hereby made for a description of the complete instrument and mode of operation, this application disclosing only those parts directly associated with the present invention.

Figure 1:
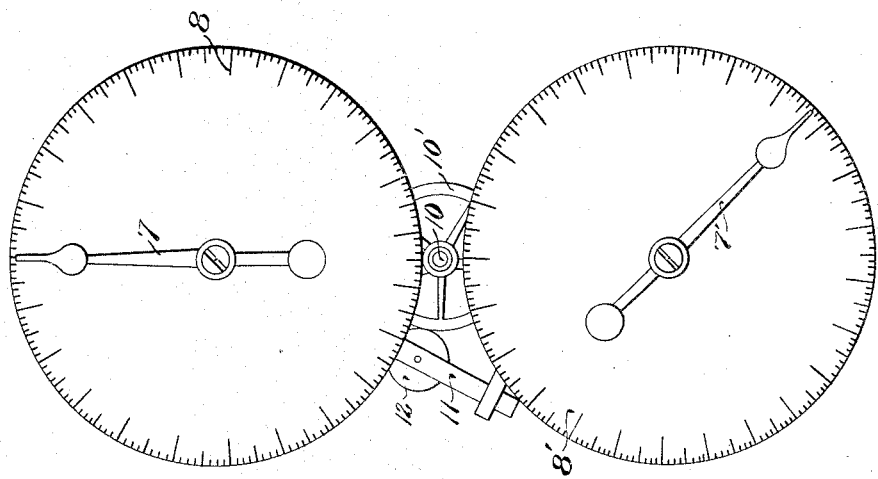
Fig. 1 is a front elevation.

In Fig. 1 pointers 7 and 7' are adapted to be intermittently advanced over dials 8 and 8' by shafts 9 and 9' arranged to be alternately rotated by shaft 10 which is rotated at the same speed as the propeller shaft or proportional thereto or, if a plurality of propellers are used, at the average speed of said propellers or at a speed proportional thereto. For making the connection between shaft 10 and shafts 9 and 9', respectively, arms 11 and 11' are pivoted to shafts 9 and 9', respectively, and support trains of gears 12 and 12' in mesh with gear wheels 13 and 13' fast on shafts 9 and 9'. The arms 11 and 11' are adapted to be yieldingly forced toward gear 10' on shaft 10 by springs 14 and 14' attached to brackets 15 and 15' fast on back plate 16, Fig. 3, of the instrument. The control means for alternately throwing the trains of gears 12 and 12' into mesh with gear 10' may comprise bars 17 and 17' longitudinally reciprocable as described in the aforesaid applications and operating shafts 18 and 18' by means of pawls 19 and 19' and ratchet wheels 20 and 20'. The operative connection between shafts 18 and 18' and arms 11 and 11', respectively, is by means of pinions 21 and 21' which are provided with elongate teeth with which arms 22 and 22' attached to arms 11 and 11' respectively are adapted to cooperate.

Figure 2:
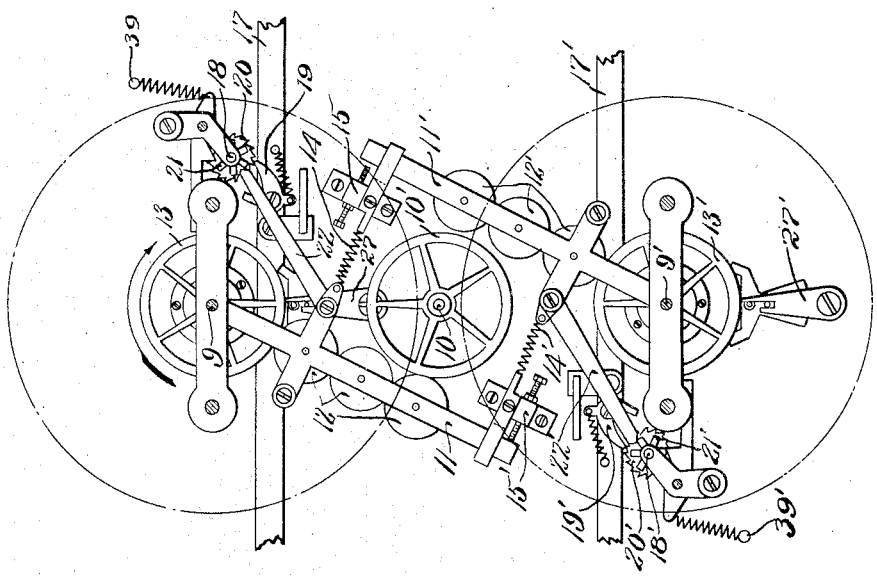
Fig. 2 is a front elevation of the mechanism behind the dials in Fig. 1.

Attention is now directed to Figs. 3 to 6 in which the operation of the control mechanism for one of the pointers, specifically the pointer 7, is illustrated. As shown in Fig. 3 shaft 9, to which the pointer 7 is fast, has in addition to gear wheel 13, an annulus 25 having a smooth peripheral face, and an escape wheel 26 with which escapement pawl and stop mechanism 27 (Fig. 2) is adapted to cooperate in restraining the resetting speed of shaft 9 under the impulse of a suitable resetting spring (not shown) which is disposed in spring housing 28 (Fig. 3). The particular means provided for preventing retrograde movement of pointer 7 preferably comprises a roller clutch mechanism shown in detail in Figs. 4 to 6. This mechanism comprises a roller 29 adapted for contact with the peripheral face of annulus 25 and operating in an oblique groove 30 in block 31 fast on post 32 extending from back plate 16. Roller 29 is retained in groove 30 and in contact with annulus 25 by a flexible finger or spring 33. The obliquity of groove 30 is such that roller 29 is wedged in the groove in position to lock shaft 9 against movement when the latter tends to rotate backwardly on the release of the driving mechanism or as a result of back-lash in an intermittent drive mechanism. .To render roller 29 inoperative to clutch shaft 9 against movement, as when the pointer 7 is to be reset, means are provided which may take the form of a lever 34 pivoted at 35 and having a hook end 36 adapted to pass into groove 30 to force roller 29 downwardly out of contact with annulus 25. Lever 34 has a trip end or projection 37 adapted to be contacted by the elongate teeth of pinion 21, and is held in contact therewith by a coil spring 38 fast at one end to the short arm of lever 34 and at the other end to a pin 39 projecting from back plate 16. To prevent rebound when pointer 7 is reset a stop lever 40 may be mounted upon pivot 35 and be actuated by a spring 41 also attached to pin 39. The free end of lever 40 is adapted to cooperate with escape wheel 26 and the lever is further provided with a projection (not shown) similar to projection 37 on lever 34 for cooperation with the teeth of pinion 21.

The operation of the device is clearly indicated in Figs. 4, 5 and 6. In Fig. 4 the parts are shown in the position in which shaft 9 is rotating in the direction to advance pointer 7 around its dial 8 in a clockwise direction. The roller clutch is now in position to lock shaft 9 against reverse movement. Levers 34 and 40 are inoperative. In Fig. 5 shaft 18, carrying pinion 21, has been moved one notch of ratchet wheel 20 through the actuation of bar 17 which turns shaft 18 through pawl 19 and ratchet wheel 20. This movement of shaft 18 brings one of the teeth on pinion 21 directly beneath projection 37 on lever 34 and the similar projection on lever 40 so that levers 34 and 40 are held out of contact with roller 29 and escape wheel 26 respectively. Another tooth on pinion 21 has actuated arm 22 (Fig. 2) to force arm 11 outwardly and the train of gears 12 out of mesh with wheel 10' so that shaft 9 is no longer rotated and is locked against the slightest reverse movement by roller 29.

Fig. 6 shows the position of the parts during resetting of pointer 7. Here bar 17 has again been actuated to move shaft 18 one notch of ratchet wheel 20 moving the tooth on pinion 21 which has upheld levers 34 and 40 in Figs. 4 and 5 out of contact therewith so that springs 38 and 41 force levers 34 and 40 downwardly, the former to move roller 29 out of contact with annulus 25 to permit shaft 9 to be reversely rotated to reset position, the latter to contact with escape wheel 26 upon which it acts as a click during reverse rotation of shaft 9 under the impulse of the resetting spring. Hence lever 40 prevents rebound when shaft 9 has reached its reset position.

From the above it will be clear that pinion 21 with its elongate teeth controls not only the throwing into gear of shaft 9 with the driving shaft 10, but also the actuation of levers 34 and 40 which serve to render the roller clutch mechanism inoperative and to prevent rebound of the shaft 9 when reset. The roller 29 operating in the oblique groove 30 under impulse of spring finger 33 has been found to be particularly effective in practice in preventing irregular movement of pointer 7 under the intermittent rotation of shaft 9, as well as for holding it against any retrograde movement when the driving gears are thrown out of mesh.

The roller-clutch being continuously in operating position during the forward movement of the hands prevents, at any time during that movement, the slightest retrograde movement; therefore the full and exact advancement of the hands about the dial face is indicated at any instant.

A further advantage of this mechanism is that in connection with an intermittently advanced pointer (especially where there is back lash in the intermittent movement) the dial hands advance with no backward movement between the intermittent advances.

However, the principal advantage of the invention is the accurate indication of the full forward movement of the dial hands at the instant the driving connection is broken.

The resetting spring is constantly exerting a force in the opposite direction to the driving force; therefore if the smallest interval of time intervenes between the release of the driving force and the locking of the dial hands against the force of the resetting spring there will be a slight retrograde movement of the dial hands. Inasmuch as the roller-clutch is constantly operating during all the advance movement of the dial hands and while they are at rest in indicating position there can not be the slightest retrograde movement, and therefore the true and exact advancement of the dial hands is indicated at each instant and is registered or indicated in the final position until the hands are reset.

I claim:

1. In a device having a member adapted to be advanced over a predetermined path and afterwards reset, means for advancing said member, mechanism for continuously holding said member against reverse movement in any position of its advance including its final position before being reset, and means to release said mechanism to allow said member to be reset.

2. In a device having a member adapted to be advanced over a predetermined path and afterwards reset, means for advancing said member, means for holding said member against back-lash in any position of its advance, and mechanism including a controller adapted to be recurrently actuated in the same direction, said two means being thrown into and out of operation in successive positions of the controller.

3. In a device having a member adapted to be advanced over a predetermined path and afterwards reset, means for advancing said member, means for holding said member against retrograde movement in any position of its advance, means for preventing rebound of said member when reset, and means for conjointly controlling the operation of said means.

4. In a device having a member adapted to be advanced over a predetermined path and afterwards reset, means for advancing said member, means for holding said member against retrograde movement in any position of its advance, means for preventing rebound of said member when reset, and control mechanism for simultaneously rendering said first two means operative and the third means inoperative to start said member.

5. In a device having a member adapted to be advanced over a predetermined path and afterwards reset, means for advancing said member, means for preventing rebound of said member when reset, and control mechanism for simultaneously rendering said second means inoperative when said first means is rendered operative.

6. In a device of the class described a shaft adapted to be rotated in one direction and then reset, a roller clutch for preventing retrograde movement of the shaft during its operation, means for rendering said clutch inoperative when the shaft is to be reversed for resetting, and means for preventing rebound during resetting, each of said means being arranged to be thrown into operation when the other is thrown out of operation.

7. In a device having a member adapted to be advanced over a predetermined path and afterwards reset, means for advancing said member, means for automatically locking the member against retrograde movement in any position of its advance, and means for rendering said locking means inoperative when the member is to be rotated in the reverse direction to be reset.

8. In a device having a member adapted to be advanced over a predetermined path and afterwards reset, an annulus fast to the shaft which operates the member, and means in frictional engagement with said annulus automatically to lock it against retrograde movement, a member adapted normally to force said means out of frictional engagement with said annulus, and means for maintaining said last-named member inoperative until the device is being reset.

9. In a device having a member adapted to be advanced over a predetermined path and afterwards reset, a shaft for actuating the member, an element fast to said shaft having a peripheral surface, a support adjacent said element, a guide groove in said support, a circular member in said groove, means retaining said circular member in frictional contact with the peripheral surface of said element whereby the latter is locked against retrograde movement by said circular member, a member mounted adjacent said support and having a hook end operative to force said circular member out of engagement with said element, and means for rendering said last-named member operative when the device is to be reset.

10. In a device having a member adapted to be advanced over a predetermined path and afterwards reset, a shaft for actuating the member, an element fast to said shaft having a peripheral surface, a support adjacent said element, an oblique guide groove in said support inclined toward said element in the direction of reverse movement thereof, a roller in said groove, a resilient member adapted to retain said roller in said groove and in frictional contact with the peripheral surface of said element, whereby the latter is automatically locked against retrograde movement by said roller, a lever mounted adjacent said support and having a hook end adapted normally to enter said groove and force said roller out of contact with said element in opposition to said resilient member, and means for maintaining said lever inoperative until the device is to be reset.

11. In a device of the class described a shaft adapted to be rotated in one direction and then reset, a member fast on said shaft, means in frictional contact with said member automatically to resist retrograde movement of said shaft during its intermittent rotation, means including a lever arranged to normally retain said first-named means out of engagement with said member, and means for maintaining said last-named means inoperative until the device is to be reset.

12. In a device of the class described a shaft adapted to be rotated in one direction and then reset, a roller clutch for preventing retrograde movement of the shaft during its operation, and means for rendering said clutch inoperative when the shaft is to be reversed for resetting.

Signed by me at Boston, Massachusetts, this 27th day of December, 1922.

GEORGE WALKER.